W. M. BEATTY.
APPARATUS FOR THE TRANSMISSION OF POWER.
APPLICATION FILED JULY 30, 1912.

1,124,387.

Patented Jan. 12, 1915.

2 SHEETS—SHEET 1.

WITNESSES.

INVENTOR.
William M. Beatty
BY
ATTORNEY.

W. M. BEATTY.
APPARATUS FOR THE TRANSMISSION OF POWER.
APPLICATION FILED JULY 30, 1912.

1,124,387.

Patented Jan. 12, 1915.
2 SHEETS—SHEET 2.

WITNESSES

INVENTOR
William M. Beatty
BY James K. Bakewell
his ATTORNEY

UNITED STATES PATENT OFFICE.

WILLIAM M. BEATTY, OF BEAVER FALLS, PENNSYLVANIA.

APPARATUS FOR THE TRANSMISSION OF POWER.

1,124,387.

Specification of Letters Patent.

Patented Jan. 12, 1915.

Application filed July 30, 1912. Serial No. 712,387.

*To all whom it may concern:*

Be it known that I, WILLIAM M. BEATTY, of Beaver Falls, in the county of Beaver and State of Pennsylvania, have invented a new and useful Apparatus for the Transmission of Power, of which the following is a full, clear, and exact description, reference being had to the accompanying drawings, in which—

Figure 1:
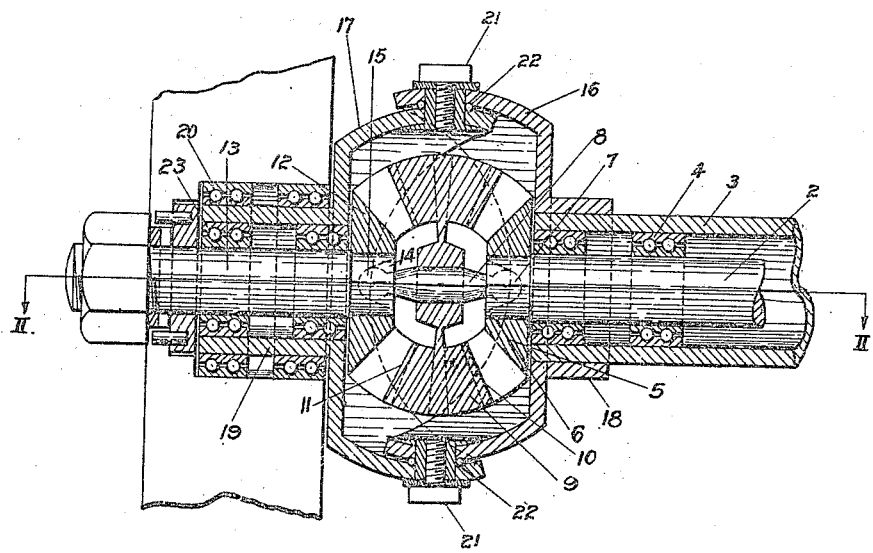
Figure 2:
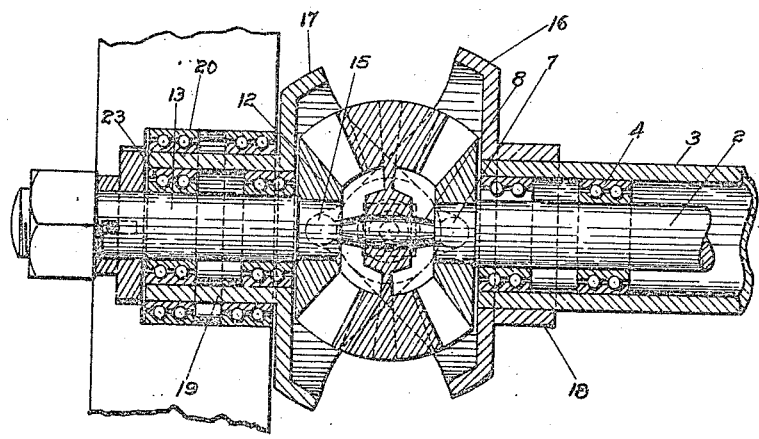
Figure 3:
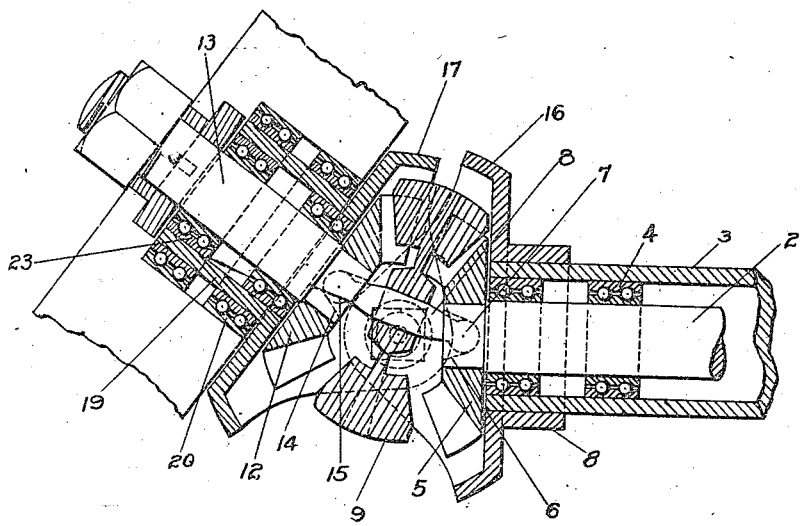
Figure 5:
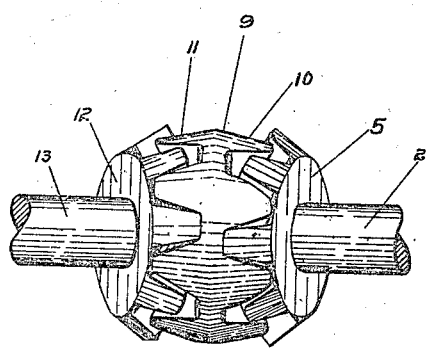
Figure 4:
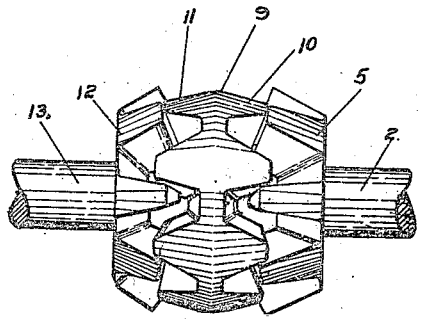

Figure 1 is a vertical sectional view showing my apparatus; Fig. 2 is a horizontal sectional view on the line II—II of Fig. 1; Fig. 3 is a horizontal sectional view of the apparatus when in a skewed position; Fig. 4 is a perspective of the crown wheels; and Fig. 5 is a like view of the same when they are skewed to each other.

Like figures of reference indicate like parts wherever they occur.

My invention relates to an improvement in apparatus whereby, in sectional shafting, the sections may be capable of change in angular relation to each other and power may be transmitted from one section to another. Although it may be applied to various forms of machinery and vehicles, I have shown and here describe it for use on automobiles, to which use it is especially adapted not only as a means for adding to the propulsive force, but as a preventive of "skidding", which is a danger incident to such vehicles where power is applied only to the rear axle and wheels.

In the drawing 2 represents the middle portion of a live-shaft which is driven by any suitable mechanism for communicating power, preferably from the rear axle of the vehicle, the shaft being the center of the front axle and forming part of the driving mechanism for imparting power to the front wheels. It may be connected with the body of the vehicle by means of a sheath or dead axle 3 and supported therein by ball bearings 4, or by any of the devices ordinarily employed in supporting the rear axle or main driving shaft of the vehicle. At each end of the shaft 2 is a miter-wheel 5, which is keyed to the shaft, or secured thereto by other suitable means, and in the ends of the shaft 2 are sockets 6 for the reception of a ball 7 on the end of the short idler shaft 8, thus forming a ball and socket joint between the live shaft 2 and the idler shaft 8. Keyed, or otherwise fixed to the idler shaft 8 are double miter-wheels 9, one face 10 of each of which meshes with the face of the miter-wheel 5 on the end of the shaft 2, and the other face 11 of the double miter-wheel meshes with a miter-wheel 12 which is fixed to the end of the hub axle or shaft 13. This hub shaft is provided with a socket 14 and the other end of the shaft 8 is provided with a ball 15, the ball 15 and socket 14 being counter parts of the ball 7 and socket 6 at the other end of the idler shaft 8. As the hub shaft 13 and the driving shaft are fixed relatively to each other by their attachment to the vehicle, the teeth of the miter-wheels mesh with each other at all times, yet being capable of altering their position, as where the vehicle is rounding a curve. When steering on a curve the teeth of the miter-wheels engage to a greater or less depth than when the vehicle is running on a straight line, depending upon the extent to which the vehicle is turned. The devices, so far described, are capable of being brought at an angle to each other in any direction. In case of automobiles or other vehicles the change of angle must be limited to a horizontal plane. To effect this limitation a swiveled clevis may be employed, which is formed in two parts, 16 and 17, the part 16 having a sleeve 18 which is fixed to the sleeve or dead axle 3, and the part 17 having a sleeve 19 which fits between ball bearings 20 and 23 of the hub of the axle or shaft 13. The upper and lower parts of the clevis are pivoted to each other by means of a bolt and nut 21 and ball bearings 22. This arrangement permits the necessary horizontal movement of the wheels and at the same time prevents a vertical movement thereof.

Although I have shown and described certain forms of bearings and connections, I do not desire to limit myself thereto. I have shown and described the idler shaft 8 as a member extending through the intermediate double faced or disk gearing, but it will be understood that the idler shaft may be formed integral therewith.

The advantages of my invention will be appreciated by those skilled in the art.

Having thus described my invention, what I claim and desire to secure by Letters Patent is:—

1. Apparatus for transmitting power, comprising a primary or power shaft, a secondary shaft, miter gears secured to said shafts, an intermediate gear meshing with said gears, and an idler shaft passing through and secured to said intermediate gear and having ball and socket connections with said primary and secondary shafts.

2. Apparatus for transmitting power, comprising a primary or power shaft, a secondary shaft, miter gears secured to said shafts, an intermediate gear meshing with said gears, an idler shaft passing through and secured to said intermediate gear and having ball and socket connections with said primary and secondary shafts, and a divided housing having the parts pivotally connected and inclosing said gears to maintain them in operative relation.

3. Apparatus for transmitting power, comprising a primary or power shaft, a secondary shaft, miter gears secured to said shafts, a disk member intermediate said gears having integral teeth projecting from opposite faces thereof and meshing with said miter gears, respectively, and an idler shaft passing through and secured to said disk and having ball and socket connections with said primary and secondary shafts.

In testimony whereof, I have hereunto set my hand.

WILLIAM M. BEATTY

Witnesses:
GEORGE W. MORRISON,
ALONZO B. CHALFANT.